United States Patent Office 2,985,218
Patented May 23, 1961

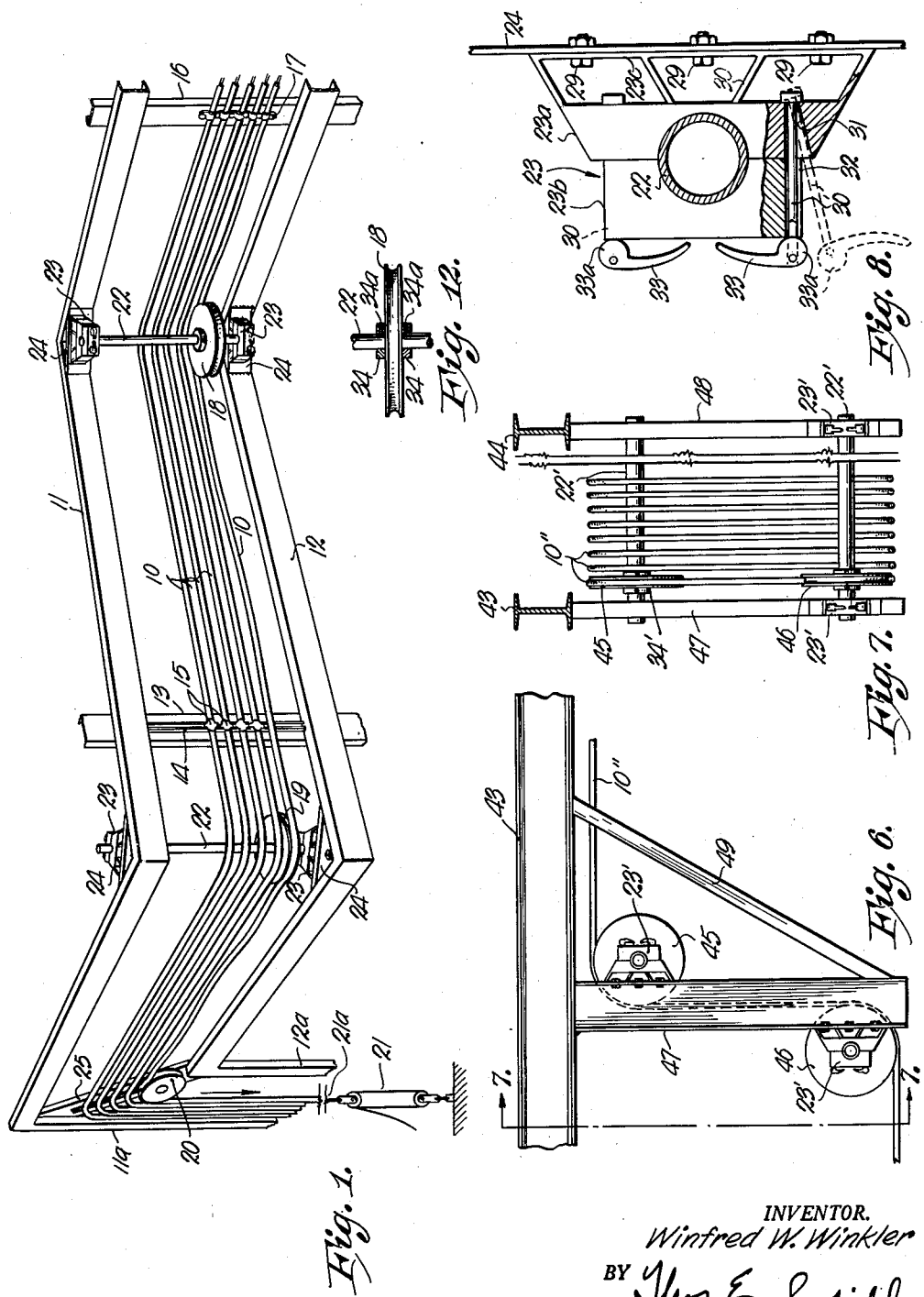

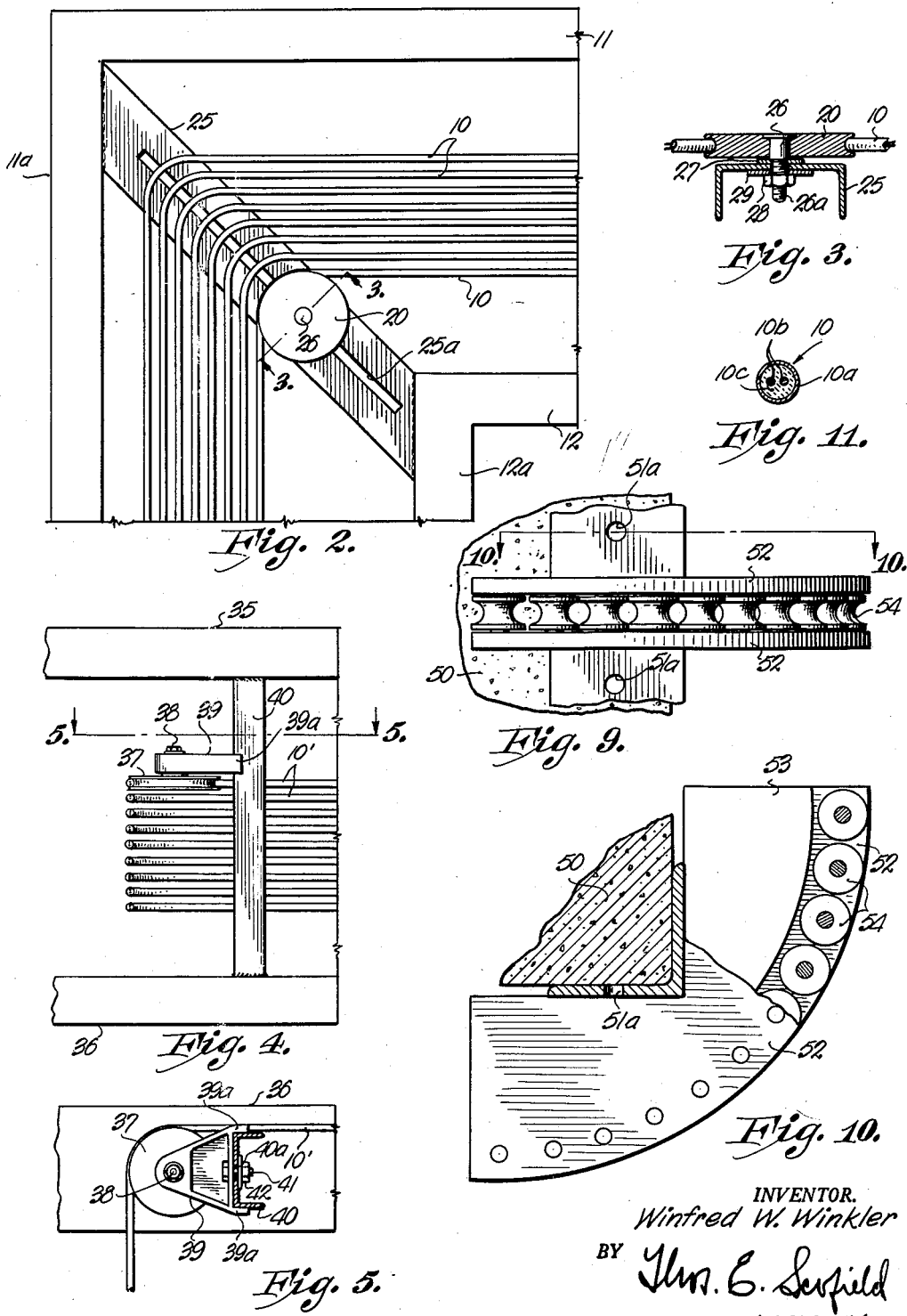

2,985,218
METHOD OF AND APPARATUS FOR INSTALLING METAL SHEATHED ELECTRIC TRANSMISSION CABLE

Winfred W. Winkler, Mission Urban Township, Kans. (3724 W. 76th St., Kansas City, Mo.)

Filed June 29, 1956, Ser. No. 594,833

2 Claims. (Cl. 153—32)

This invention relates to the installation, in building or other structural frameworks, of lengths of conduit of a type having the property of being easily bent into a tortuous path and capable of assuming a permanent set with the bends and adjacent lengths self-supporting following installation, and refers more particularly to an improved method of installation of such conduit and apparatus for use in performance of the method.

The primary field of application of my invention lies in the installation of special electrical cable known in the trade as "MI" cable. This cable consists of soft copper tubing containing within it, but spaced from the inside walls and from one another, one or more conductors in the form of wire extending axially of the tubing. The bare conductors are held separated from one another and from the inside wall of the tubing by means of a tightly packed powderous material, usually some sort of mineral compound. The soft copper tubing forms the sheath for the conductors, being insulated from them by the powderous insulation material. This type of cable has excellent properties of corrosion resistance and can be used in localities where temperatures are quite high. It is also desirable for the reason that while it can be bent relatively easy, it will assume a permanent set in the bent condition and has the capacity of self-support over relatively long lengths. In other words, in installing cable of this type the cable need not be tacked at short intervals to a support backing.

In most installations the cable is necessarily arranged in a tortuous path reflecting the character of the building or other framework which provides its support. For example, on the inside of a building the cable may extend horizontally along one wall and then bend at the corner to lie parallel with a connecting wall. Ordinarily the cable is not attached directly to the wall but is secured by means of an auxiliary framework to the joists or beams which may be exposed. Succeeding or intermediate bends may be provided to direct the cable upwardly or downwardly, either vertically or at angles therefrom.

Heretofore the usual practice has been to install such cables by hand, all of the bends being formed by hand and the lengths between the bends also being straightened by hand. However, as will be evident, the bending must be done very carefully so as to avoid disrupting the powderous insulation material. Moreover, proper orientation of the bends at the desired locations and the obtaining of a neat appearance of the cables involves much time consuming effort. This is particularly true where a plurality of parallel cables are to be installed. As a matter of fact one of the primary hurdles still standing in the way of more universal adoption of MI cable is the relatively high labor costs involved in making installations.

An important object of the present invention is to provide a method of installation for cables of the character described in which the bends are accurately located and are correctly formed, and which cuts down materially on the time and labor previously necessary to effect such installations.

Another object of the invention is to provide apparatus through the use of which cables of the character described can be installed in a supporting framework in a tortuous path and by which the bends are accurately formed with little likelihood of damage to the cable structure.

A further object of the invention is to provide apparatus for use in installation of cable of the character described which includes support members adapted to be mounted on the framework, the support members having cable guide seats which can be moved to several positions without demounting the support members from the framework thereby making it possible to install banks composed of a plurality of cables with the support members fixed in one position.

Still another object of the invention is to provide apparatus for use in installation of cable of the character described by means of which a parallel bank composed of a plurality of said wires can be formed with the bends either in parallel planes or in a common plane.

Other and further objects of the invention together with the features of novelty appurtenant thereto will appear during the course of the following description.

In the accompanying drawings which form a part of the specification and are to be read in conjunction therewith, and in which like reference numerals indicate like parts in the various views;

Fig. 1 is a partially schematic perspective view illustrating a typical installation of cable of the character described and showing a preferred way of carrying out the method;

Fig. 2 is an enlarged front elevation of one portion of the installation of Fig. 1;

Fig. 3 is a view taken along the line 3—3 of Fig. 2 in the direction of the arrows;

Fig. 4 is a front elevational view of a portion of a modified installation showing another form of apparatus for carrying out the method;

Fig. 5 is a view taken along the line 5—5 of Fig. 4 in the direction of the arrows;

Fig. 6 is a front elevational view of a portion of still another modified installation;

Fig. 7 is a view taken along the line 7—7 of Fig. 6 in the direction of the arrows;

Fig. 8 is an enlarged end view of the releasable axle support shown in Figs. 1 and 6;

Fig. 9 is an edge on view of a modified bend forming guide and support;

Fig. 10 is a view taken along the line 10—10 of Fig. 9 in the direction of the arrows;

Fig. 11 is an enlarged transverse cross section through one type of cable in connection with which the inventive method and apparatus are employed; and Fig. 12 is an enlarged elevational view of an axle mounted sheave showing the collars for longitudinally positioning the sheave on the axle.

Referring to the drawings and initially to Figs. 1 and 11, Fig. 1 shows a typical installation of a bank of parallel cables 10 bent at intervals to form a tortuous path. In the illustrated example the cables are located between a pair of upper and lower building framework members, the upper framework member being indicated at 11 and the lower one at 12. For purposes of illustration, the horizontal framework members 11 and 12 are shown at the lefthand end of Fig. 1 as joining vertical members 11a and 12a forming in effect an open corner in a vertical plane. While the structural framework members are illustrated as channels, it will be understood that they may as well be I beams, angles or of any other cross section. They are simply structural members normally used in construction of buildings, refinery towers and the like. I have selected the particular arrangement shown as a typical example of one type of framework in which it may be desirable to install electrical cables of the character described and as a background for explaining the utility of and basic principles involved in the invention. The invention is adaptable to many other frameworks, as will become evident during the course of the description.

The cable I have selected to illustrate my invention is cylindrical in cross section (see Fig. 11), consisting of an outer sheath or tube 10a, a pair of spaced parallel conductors 10b within the tubing, and a powderous insulation 10c compacted within the tube and filling all voids. The outer sheath or tubing 10a is usually formed of annealed copper, as are the conductors 10b. In the National Electric Code, article 330, this cable is identified as type MI. It is furnished in coils which, depending on diameter, vary in length from 175 to 2,000 feet. It has the property of being easily bendable while retaining sufficient rigidity that it is self-supporting over relatively long lengths.

As shown in Fig. 1, the path of each cable 10 (beginning from the right hand end of the figure), involves a first straight portion, a 90° bend to the left, a second straight portion, a 90° bend to the right, another intermediate straight portion, and a 90° bend downward. This conforms, of course, to the arrangement of the structural members 11 and 12. The cables 10 are spatially separated from the structurals 11 and 12 and from one another. I have shown, for purposes of illustration, an intermediate vertical structural 13 having secured to its front face a spacer member 14 to which the lengths of the cable may be clipped by clips 15. The details of construction of the spacer and clips are well known to the art, and are commercially available. Since they play no part in my invention, they will not be described further. While I have shown only one such spacer, it will be understood that as many may be used as is necessary to adequately support the cables after installation. It is usual to locate the spacers along the straight lengths of the cable, leaving the bends unconnected with any direct supporting structure. Due to the nature of the cable, the bends, once formed, are permanent and the cable is inherently self-supporting therearound.

As has been noted earlier herein, it has been the usual practice, in making an installation similar to that shown in Fig. 1, to do all the necessary bending and straightening by hand labor. In the present invention this hand work (with the exception of rough preliminary guiding of the cable to an approximation of its final installed path) has been eliminated. The method of installation and apparatus having certain advantages in the performance of the method will now be described.

In its broadest aspect, the method of installation comprises the steps of preliminarily arranging the cable in an approximattion of the finally installed path, supporting the cable in a lateral direction at the inside of each bend, exerting a tension on the cable to bend it around the points of support at the bend locations while at the same time straightening out the portions of the cable on opposite sides of the bend, and removing the tension and support thereby to leave the cable in a permanently set tortuous path. The steps of the method are illustrated in one specific embodiment in Fig. 1, with particular reference to the lowermost of the cables 10. It should be understood that the four cables above the lowermost cable are in the finally installed position, the same procedure having been followed as is now about to be described in connection with the lowermost cable.

In making the installation, a suitable length of cable 10 is obtained and it is arranged preliminarily by hand in a rough approximation of the final path. One end of the cable is firmly anchored to any suitable support, such as the vertical structural 16 to which the cable is anchored by means of a conventional clamp 17. At each of the bends a lateral support for the cable is provided, the supports in the illustrated embodiment being provided by sheaves 18, 19, and 20, respectively. The sheaves preferably have grooved peripheries providing a cable guide seat and are of a radius equal to the desired radius of curvature of the bend. Each sheave or pulley is firmly fixed to the support framework in a manner later to be described. While the cable is in contact with the bend supports, a traction is applied to the end opposite from the anchored end with the result that the cable is drawn taut around and between the support points. To apply the traction a conventional block and tackle 21 with a cable grip 21a may be used, although it will be evident that other traction mechanisms are equally adaptable to the purpose sought. Once the bends have been formed and the cable straightened between the bends, the cable is clipped to the spacer 14, the traction forces removed, and the supports at the bends are demounted from the structure.

In the installation of a bank of cables as shown in Fig. 1, the uppermost cable is installed first, the procedure above described being followed in the case of each cable. The cable guides 18, 19 and 20 are adjusted to new positions to accommodate them to the successive cables, and in the particular apparatus I have developed, this adjustment can be accomplished quickly and easily, as will hereinafter be shown.

The preferred bend support and guide for the cable comprises a sheave or pulley provided with a peripheral groove in which the cable is adapted to seat. The sheaves 18 and 19 are supported in identical fashion, each being rotatably mounted on an axle or shaft 22. The ends of the axles 22 are supported by support blocks 23, later to be described in detail. For the present, it is enough to say that blocks 23 are firmly secured to support plates 24 which are in turn secured to the structurals 11 and 12 by welding, bolts or otherwise.

The cable guide 20 of the downward bend is also a peripherally grooved sheave or pully. Instead, however, of being mounted on a vertical axis it is disposed for rotation about a horizontal axis and is carried on a diagonal member 25 which is secured at its respective ends between the framework sections 11a and 12a (see Fig. 2). In the preferred form, the diagonal member 25 is a channel member having a central elongated longitudinal slot 25a. Sheave 20 is rotatably channeled on a stub shaft 26 having a threaded extension 26a which extends through slot 25a (Fig. 3). A washer 27 is provided on the outside of the channel around stub shaft 26, the washer engaging a shoulder on the shaft at the inner terminus of the threaded extension 26a. A nut 28 is threaded on the outer end of extension 26a and is tightened against a friction plate 29 having an aperture through which extension 26a extends and which serves to firmly anchor the sheave 20 in a fixed position on the member 25. It will be evident, however, that by loosening nut 28 the sheave can be moved lengthwise of the member 25 and locked in a new position by again tightening down the nut. This adjustability of the sheave on member 25 is necessary in order to provide for inward movement of the sheave as successive cables are installed.

It is important to understand at this point that the cable guides or formers represented by sheaves 18, 19 and 20, and the supporting structure therefor (members 24 and 25) are not a part of the basic building framework. They are installed instead as temporary auxiliary members whose basic purpose is to provide a means of carrying out my method. Once the cables have been installed they are removed from the framework since they are not necessary to the support of the cable after completion of the installation.

Returning now to the details of construction of the support blocks 23 for axles 22, and referring particularly to Fig. 8, the block is formed of two basic and complementary parts including a base member 23a and a separable clamping member 23b. The base member 23a is provided with an open construction forming a supporting web 23c which is apertured to receive a plurality of bolts 29 for bolting it to a support such as plate 24. Braces 55 may be provided between the main body of the base member and web 23c to reinforce the web against bending. The confronting faces of members 23a and 23b are provided with complementary semi-cylindrical recesses which form a cylindrical aperture through which extends the axle 22. Preferably the diameter of the aperture is slightly less than the outside diameter of the axle so that the axle is firmly gripped therein.

The separable clamping member 23b is tightly clamped to the base member by a pair of parallel tie rods 30 which extend through tapered apertures 31 in base member 23a. Enlarged heads 30a are provided on the inner ends of tie rods 30 to prevent withdrawal of the rods from the base member. When the members 23a and 23b are clamped together, tie rods 30 lie within trough-like recesses 32 formed on the opposite sides of the base member as shown in the solid lines in the broken away portion of Fig. 8. At the outer end each tie rod is provided with a pivotal lever 33 having an eccentric portion 33a which engages the outer face of member 23b. When the levers 33 are in the solid line position of Fig. 8, tie rods 30 are under tension due to the pressure of the eccentric against the face of member 23b; and the members 23a and 23b are firmly clamped together with a portion of axle 22 therebetween. To release the axle it is necessary only to pivot the levers 33 outwardly, thereby relieving the pressure of the eccentric. The rods 30 can then be shifted outwardly as shown in the broken lines in Fig. 8 to disengage them from grooves or troughs 32 and to dispose the levers to one side of member 23b. The member 23b can then be moved away from base member 23a to free the axle for movement in a direction transverse to its axis away from the base member.

The provision of means whereby the axle can be unclamped and moved laterally away from the base member 23a and its support plate 24 is of great advantage in that it makes possible the quick disengagement of the sheave from the cable after installation of the cable has been completed so that the sheave can be adjusted axially along the axle to a new position to receive the next cable. This may be best understood by again referring to Fig. 1. It will be evident that following the application of traction to lowermost cable 10, the cable will be seated in the grooves of the sheaves. If another cable were to be installed below the lowermost cable, then the sheaves 18 and 19 would have to be moved axially downward on the axles a distance equal to the intended lateral spacing of the cables. However, the sheaves 18 and 19 cannot be moved without first disengaging the installed cable from the grooves. By providing the releasable support for axle 22, the axles, upon disengagement of the clamping members 23b, can be moved outwardly away from the cables which in turn disengages the sheaves carried thereon from the cables. The sheaves can then be moved along on the axles to the next position and the axles again reengaged with their support blocks 23 in the fashion earlier described. The necessary movement of sheave 20 has been described earlier.

To releasably fix sheaves 18 and 19 on the axles 22 at any desired location, any suitable means may be employed. I prefer a pair of collars 34 slidably mounted on the axles on opposite sides of the sheave and provided with lateral set screws 34a (see Fig. 12) which can be tightened down to secure the collars at any point along the axles.

In Figs. 4 and 5 I have shown another type of cable support and guide seat which may be employed in certain situations. Here the parallel cables are indicated at 10', only one bend in each cable being shown. The bend is formed between a pair of parallel structural framework members 35 and 36. The sheave is indicated at 37. The sheave is journaled on a pin or shaft 38 which extends from one side of the bracket 39. Bracket 39 is in turn slidably supported for longitudinal movement on an auxiliary channel member 40 which is firmly secured by welding or otherwise at its ends to the structurals 35 and 36. The base of the bracket contacts the base of channel 40 and carries on opposite sides of the channel a pair of extended flanges 39a which slidably engage the sides of the channel. Channel 40 is provided with an elongated slot 40a similar to slot 25a in member 25 in Fig. 3, and a bolt 41 extends through this slot, being secured at one end to the bracket 39 and receiving at the other end a nut 42 which can be tightened down to secure the bracket against the movement longitudinally of channel 40. When it is desired to shift the bracket into position to receive another cable, nut 42 can be loosened and the bracket moved longitudinally of the channel to the new location after which nut 42 will again be tightened.

In using a cable bending guide like that illustrated in Figs. 4 and 5, care should be taken to insure that at some point close by the cable can be freed to provide enough slack to permit slipping of the cable from the grooved periphery of the sheave. Such a guide can be used either ahead of or behind any of the guides illustrated in Fig. 1, since the latter, as has already been explained, can be disengaged from the cable without requiring any deformation or manipulation thereof. When they are disengaged the cable has enough freedom that by a simple manipulation the portion passing around the guide such as shown in Figs. 4 and 5 can be disengaged from the groove of the sheave with little difficulty. The sheave can then be repositioned to set it in the path of the next cable as previously described.

Figs. 6 and 7 illustrate still another installation. Here the lengths of cable 10" are being laid in a horizontal plane beneath a pair of spaced beams 43 and 44, are then directed downward into a common vertical plane, and again brought back to a horizontal plane spaced well below the first plane. The sheaves are indicated at 45 and 46, each being mounted on an axle 22' which is supported at its ends in blocks 23' identical to those shown in Figs. 1 and 8 and earlier described. The blocks 23' are carried by depending temporary auxiliary structurals 47 and 48 which are added to the framework for the express purpose of providing a support for the sheaves. Diagonal brace members 49 secured at their ends, respectively, to the beams 43 and 44 and the auxiliary structurals 47 and 48 may be added to firmly support the latter. The arrangement of blocks 23' and axles 22' is such that following the installation of each cable, sheaves 45 and 46 can be disengaged therefrom and moved axially along the axles a short distance necessary for reception of the next cable. Collars 34' are provided for indexing the sheaves 45 and 46 on their respective axles 22' as has been discussed at an earlier point herein.

In Figs. 9 and 10 there is shown still another cable guide which is useful in situations where it is desirable to form a bend in the cable around the corner of a column or other structural member. To illustrate the manner of use of this guide, I have shown in Fig. 10 a portion of the solid concrete column 50 around which the cable (not shown) is to be bent. To properly position the guide on the corner of the column there is provided an angle member, L-shaped in cross section, designated at 51. Secured to this angle member and extending outwardly therefrom are a pair of spaced of plates 52 which are separated by spacer 53 (see Fig. 10). The outside edge of plates 52 is in each case curved to conform to the curvature of the bend and the plates extend well past the periphery of spacer 53 to form an arcuate trough with the periphery of the spacer 53 at the bottom thereof. Located within this trough are a plurality of small grooved rollers 54 which are journaled in the plates 52.

The axes of rollers 54 are arranged on a line reflecting the curvature for the bend.

In utilizing the forming guide illustrated in Figs. 9 and 10, the angle 51 is seated on the corner of the column 50 as shown in Fig. 10. With the cable aligned generally with the rollers 54, the placing of the cable under tension will cause the cable to assume the curved defined by the rollers. The cable will seat in the grooves of the rollers which will rotate with longitudinal movement of the cable as the slack is taken up. As in the case of the forming guide illustrated in Figs. 4 and 5 the guide of Figs. 9 and 10 should be located close to a point where the cable can be freed from its support after installation so that sufficient slack can be obtained to permit manual slipping of the cable from the roller trough to permit withdrawal of the guide from between the cable and the column.

Where there are bolt holes in the column the guide can be releasably fixed in position by utilizing the bolting apertures 51a in the angle 51. Where the column does not have bolting apertures the guide can be held in position by hand until enough tension has been applied to the cable that the inward pressure of the cable itself on the guide will retain it in position.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Inasmuch as many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A method of intalling a length of pliable MI cable on a framework in a permanent tortuous path having at least one bend, said cable being of the type having the property of remaining in a permanently set condition when installed in said tortuous path, comprising the steps of preliminarily arranging the length of said cable in a rough approximation of the installed path on the framework, anchoring one end of said cable, applying a traction force on the other end of said cable tending to draw said cable out in a straight line, continuing to apply said traction force while supporting said cable at a point intermediate its end in a direction transverse to the action of the cable to cause said cable to form a bend intermediate its ends with straight portions on either side of each bend, securing the cable to the framework, releasing said traction force, and removing said support at each bend thereby to leave the cable in a permanently set tortuous path.

2. A method of installing a length of pliable MI cable on a supporting framework in a permanent tortuous path having a plurality of bends linked by intermediate straight portions said cable being of the type having the property of remaining in a permanently set condition when installed in said tortuous path, comprising the steps of preliminarily arranging the length of said cable in a rough approximation of the installed condition on the framework, anchoring one end of said cable, applying a traction force on the other end of said cable tending to draw said cable out in a straight line, continuing to apply said traction force while supporting said cable in a direction transverse to the axis thereof and on the inside of the bend at each of the bend locations to cause said cable to form a plurality of bends intermediate its ends linked by straight portions between the bends, securing the cable to the framework, releasing said traction force, and removing said support at the bends thereby to leave the cable in a permanently set tortuous path.

References Cited in the file of this patent

UNITED STATES PATENTS

| | | |
|---|---|---|
| 966,086 | Faile | Aug. 2, 1910 |
| 1,285,316 | Moseley | Nov. 19, 1918 |
| 1,299,998 | Oellrich | Apr. 8, 1919 |
| 1,999,806 | Eitel | Apr. 30, 1935 |
| 2,061,578 | Huyett | Nov. 24, 1936 |
| 2,195,763 | Wright | Apr. 2, 1940 |
| 2,202,184 | Berger | May 28, 1940 |
| 2,264,408 | Rohr et al. | Dec. 2, 1941 |
| 2,629,768 | Beil | Feb. 24, 1953 |
| 2,670,178 | De Wolf | Feb. 23, 1954 |
| 2,675,992 | Pickens | Apr. 20, 1954 |
| 2,681,580 | Dupkas | June 22, 1954 |
| 2,738,955 | Francis | Mar. 20, 1956 |